US010838970B2

(12) United States Patent
Scolnick et al.

(10) Patent No.: US 10,838,970 B2
(45) Date of Patent: Nov. 17, 2020

(54) DATA ANALYSIS SYSTEM AND METHOD

(71) Applicant: Palantir Technologies Inc., Palo Alto, CA (US)

(72) Inventors: Myles Scolnick, New York, NY (US); Jack Grossman, Albuquerque, NM (US); Jim Inoue, New York, NY (US)

(73) Assignee: PALANTIR TECHNOLOGIES INC., Denver, CO (US)

( * ) Notice: Subject to any disclaimer, the term of this patent is extended or adjusted under 35 U.S.C. 154(b) by 195 days.

(21) Appl. No.: 16/028,886

(22) Filed: Jul. 6, 2018

(65) Prior Publication Data
US 2019/0108262 A1    Apr. 11, 2019

(30) Foreign Application Priority Data

Oct. 5, 2017   (GB) .................................. 1716304.9

(51) Int. Cl.
*G06F 17/00*        (2019.01)
*G06F 16/2458*   (2019.01)
*G06F 16/215*     (2019.01)
*G06F 16/36*        (2019.01)
*G06F 16/2455*   (2019.01)
(Continued)

(52) U.S. Cl.
CPC ........ *G06F 16/2462* (2019.01); *G06F 16/215* (2019.01); *G06F 16/248* (2019.01); *G06F 16/2456* (2019.01); *G06F 16/288* (2019.01); *G06F 16/367* (2019.01)

(58) Field of Classification Search
None
See application file for complete search history.

(56) References Cited

U.S. PATENT DOCUMENTS

| 8,713,467 | B1 | 4/2014 | Goldenberg et al. |
| 10,353,912 | B2 * | 7/2019 | Zheng .................... G06F 16/254 |
| 2006/0173868 | A1 * | 8/2006 | Angele .................... G06F 16/84 |

(Continued)

FOREIGN PATENT DOCUMENTS

EP    3477489    5/2019

OTHER PUBLICATIONS

Official Communication for European Patent Application No. 18182234.7 dated Apr. 2, 2019.

(Continued)

*Primary Examiner* — Hasanul Mobin
(74) *Attorney, Agent, or Firm* — Knobbe, Martens, Olson & Bear, LLP (57) ABSTRACT

This disclosure relates to a system and method for data analysis. According to a first aspect, there is described a method, the method being performed using one or more processors, comprising: receiving one or more user inputs indicative of one or more relationships between data in a plurality of datasets; determining, based on the one or more user inputs, at least one object view for visualising the data in the plurality of datasets; generating, based on the one or more user inputs, metadata comprising: an object graph indicative of the one or more relationships between two or more of the plurality of datasets; and information identifying the at least one object view; and in response to a query relating to the plurality of datasets, using the metadata to determine how response data responding to the query should be provided.

20 Claims, 7 Drawing Sheets

(51) Int. Cl.
    *G06F 16/28*    (2019.01)
    *G06F 16/248*   (2019.01)

(56) References Cited

U.S. PATENT DOCUMENTS

| | | | | |
|---|---|---|---|---|
| 2008/0033993 | A1* | 2/2008 | Uceda-Sosa | G06F 16/242 |
| 2008/0172360 | A1* | 7/2008 | Lim | G06F 16/24534 |
| 2009/0327279 | A1* | 12/2009 | Adachi | G06F 16/9535 |
| 2011/0093433 | A1* | 4/2011 | Stanfill | G06F 8/51 |
| | | | | 707/609 |
| 2013/0006976 | A1* | 1/2013 | Megler | G06F 16/248 |
| | | | | 707/725 |
| 2015/0242409 | A1* | 8/2015 | Frohock | G06F 16/21 |
| | | | | 707/620 |
| 2016/0019215 | A1* | 1/2016 | Murphey | G06F 16/22 |
| | | | | 707/723 |
| 2016/0103912 | A1* | 4/2016 | Daggett | G16H 50/70 |
| | | | | 707/736 |
| 2016/0275196 | A1* | 9/2016 | Lee | G06F 16/24522 |
| 2017/0061001 | A1* | 3/2017 | Tonkin | G06N 5/04 |
| 2017/0083547 | A1* | 3/2017 | Tonkin | G06F 16/23 |
| 2019/0147084 | A1* | 5/2019 | Pal | G06F 16/24554 |
| | | | | 707/769 |

OTHER PUBLICATIONS

Official Communication for European Patent Application No. 18182234.7 dated Apr. 14, 2020.
Bernstein et al.. "Generic Schema Matching, Ten Years Later", The 37th International Conference on Very Large Data Bases, Aug. 27, 2011, pp. 695-701.

\* cited by examiner

DATA ANALYSIS SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

This disclosure relates to a system and method for data analysis. In particular, this disclosure relates to the creation and/or use of an ontology to respond to user queries of datasets.

BACKGROUND

Large data repositories comprising multiple datasets are becoming increasingly common in the field of data analysis and analytics. These datasets may be input by different organizations, and be in different formats. However, some of the datasets may relate to the same underlying objects.

In their raw form, the datasets can be difficult for a user to query and interact with, particularly when the data required by the user is distributed across multiple datasets.

SUMMARY

According to a first aspect, this disclosure describes a method, the method being performed using one or more processors, comprising: receiving one or more user inputs indicative of one or more relationships between data in a plurality of datasets; determining, based on the one or more user inputs, at least one object view for visualizing the data in the plurality of datasets; generating, based on the one or more user inputs, metadata comprising: an object graph indicative of the one or more relationships between two or more of the plurality of datasets; and information identifying the at least one object view; and in response to a query relating to the plurality of datasets, using the metadata to determine how response data responding to the query should be provided.

The metadata may further comprise a join between at least two datasets.

The metadata may further comprise a global property assigned to a portion of the data in at least two of the plurality of datasets.

Determining how the response data should be provided may comprise searching the plurality of datasets, wherein the search is guided by the global property.

The user input may define a global property that applies to the plurality of datasets.

The global property may be determined using a method comprising: receiving one or more statistics relating to the dataset; comparing the one or more statistics to one or more threshold criteria; and in response to one or more of the threshold criteria being met, providing a suggested global property to the user.

The user input may comprise confirming the suggested global property provided to the user.

The one or more thresholds may comprise at least one of: a proportion of datasets comprising an object type and/or property; a uniqueness score; cardinalities of object types and/or properties; and/or a title key.

The method may further comprise inferring one or more joins between datasets based on the global property.

The global property may be defined by one or more data formats and/or one or more data types.

The method may further comprise synchronizing the metadata with a metadata layer stored on a server.

The at least one object view may comprise an object prominence.

According a further aspect, this disclosure describes a system comprising:
a user interface for receiving one or more user inputs; a data repository comprising a plurality of datasets; and a metadata layer comprising one or more relationships between the plurality of datasets, wherein the system is configured to perform any of the methods described herein.

According a further aspect, this disclosure describes a system comprising:
a user interface for receiving one or more user inputs; a data repository comprising a plurality of datasets; and a metadata layer comprising one or more relationships between the plurality of datasets, wherein the system is configured to: receive one or more user inputs indicative of one or more relationships between data in a plurality of datasets; determine, based on the one or more user inputs, at least one object view for visualizing the data in the plurality of datasets; generate, based on the one or more user inputs, metadata comprising: an object graph indicative of the one or more relationships between two or more of the plurality of datasets; and information identifying the at least one object view; and in response to a query relating to the plurality of datasets, use the metadata to determine how response data responding to the query should be provided.

According a further aspect, this disclosure describes a computer program comprising computer readable code that, when executed by a computing apparatus, causes the computing apparatus to perform any of the methods described herein.

According a further aspect, this disclosure describes a non-transitory computer readable medium having computer readable code stored thereon, the computer readable code, when executed by at least one processor, causing performance of the steps of: receiving one or more user inputs indicative of one or more relationships between data in a plurality of datasets; determining, based on the one or more user inputs, at least one object view for visualizing the data in the plurality of datasets; generating, based on the one or more user inputs, metadata comprising: an object graph indicative of the one or more relationships between two or more of the plurality of datasets; and information identifying the at least one object view; and in response to a query relating to the plurality of datasets, using the metadata to determine how response data responding to the query should be provided.

According a further aspect, this disclosure describes an apparatus comprising one or more processors or special-purpose computing hardware configured to perform any of the methods described herein.

According a further aspect, this disclosure describes an apparatus comprising: one or more processors; and a memory, the memory comprising instructions that, when executed by one more processors, cause the apparatus to perform the steps of: receiving one or more user inputs indicative of one or more relationships between data in a plurality of datasets; determining, based on the one or more user inputs, at least one object view for visualizing the data in the plurality of datasets; generating, based on the one or more user inputs, metadata comprising: an object graph indicative of the one or more relationships between two or more of the plurality of datasets; and information identifying the at least one object view; and in response to a query relating to the plurality of datasets, using the metadata to determine how response data responding to the query should be provided.

BRIEF DESCRIPTION OF THE DRAWINGS

Example embodiments will now be described by way of non-limiting example with reference to the accompanying drawings, in which.

DETAILED DESCRIPTION

An object graph in a separate metadata-layer that sits on top of underlying datasets is provided. This is an ontology and it indicates the relationships between the datasets, as well as metadata indicating default settings for displaying that data, such as the display prominence. The ontology data can be input by the user via a data aggregation and processing system, or can be generated automatically by the system, for example based on the frequency that particular data columns occur across multiple datasets.

The system and method provide a user friendly way of creating ontology metadata for underlying datasets. The ontology data can be used to generate and display results to user queries of the datasets.

The system and method also provide a way of visualizing the ontology metadata (e.g. links between global properties). Indicating how the data across datasets is related may be useful, but "hard coding" that information into the datasets themselves is difficult and would reduce the ease with which a user can edit the datasets, as well as requiring a huge increase in the size of the datasets.

Figure 1:
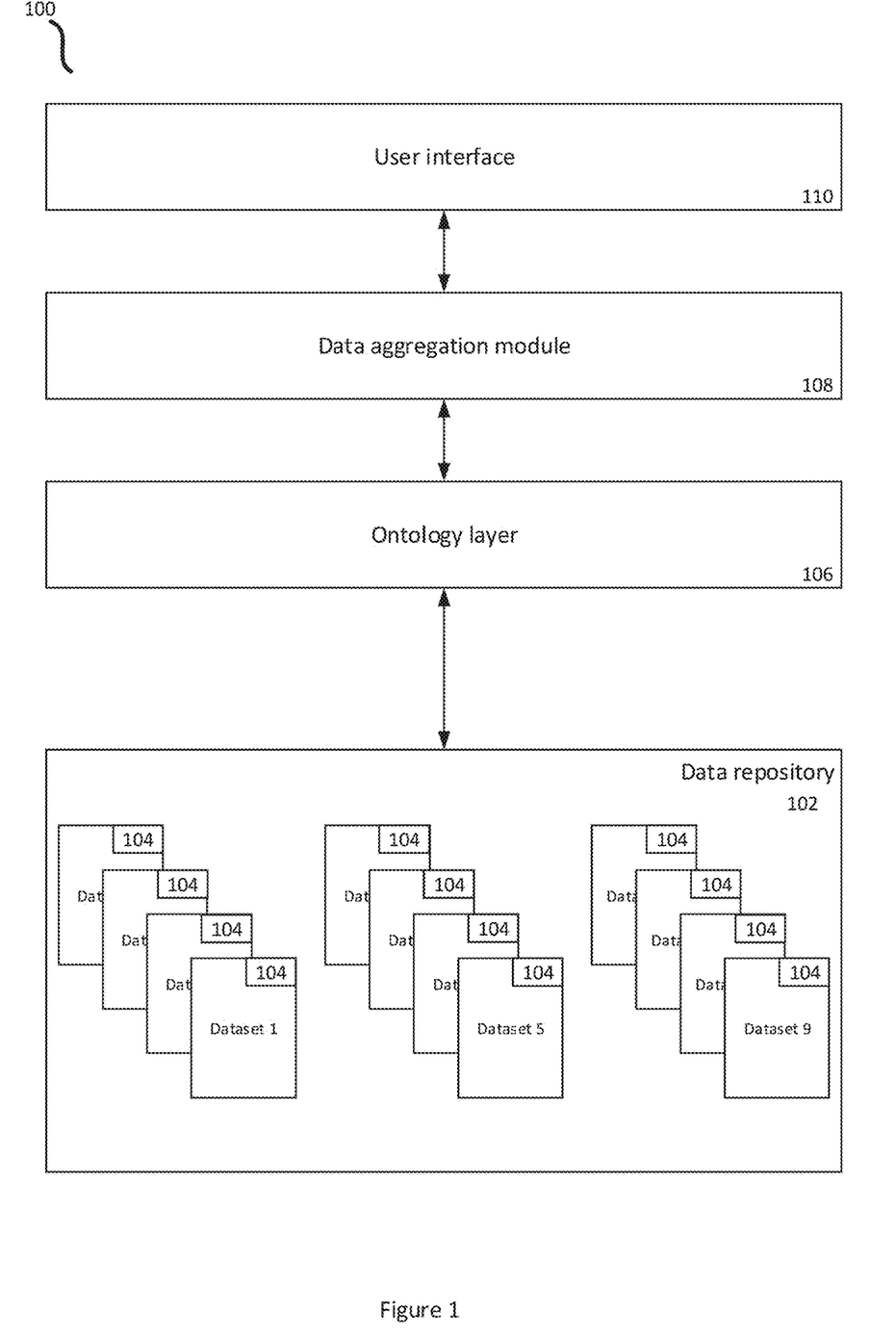
FIG. 1 shows a schematic example of a data aggregation and processing system.

FIG. 1 shows a schematic example of a data aggregation and processing system.

The system 100 comprises a data repository 102 comprising one or more of datasets 104. The each of the one or more datasets comprises data representing objects. The data repository may contain a plurality of datasets. The datasets may be in a table format, the tables comprising one or more rows and one or more columns of objects. For example, the datasets may comprise one or more tables, with the table rows representing objects and the table columns representing object properties (or vice versa). The datasets may comprise relational databases.

The data repository 102 may be a distributed data repository, with the datasets 104 comprising the data repository 102 being stored at a plurality of locations. One or more of the datasets 104 may be under control of one or more different entities. The datasets 104 may be edited by the entities that control them, for example to update the data in the dataset in light of new measurements and/or surveys.

An object may refer to a thing/a grouping of things with a given set of properties. An object may reference tangible/intangible things and/or animate/inanimate things. As non-limiting examples, an object may refer to persons, vehicles, portions of a vehicle, buildings, portions of buildings, investigations, and a portion of an investigation, schedules, or rights/demands for rights, and/or other things. Other types of objects are contemplated.

A definition of an object may describe the object by specifying/identifying one or more properties (e.g. characteristics) of the object. For example, an object may include a person and a definition of the object may describe the person by specifying/identifying particular properties (e.g. gender, height, weight, education, occupation, address, phone number) of the person. The values of the properties may be stored in one or more columns and/or rows of a database as strings, numbers and/or other forms of expression. The definition of the object may identify the particular columns and/or rows of the database storing the relevant values of the properties of the object. In some embodiments, a given property of an object may be derived from one or more values of datasets. For example, a given property of an object may be determined based on multiple values within one or more tables.

An object may be related to one or more other objects. Relationships among objects may be between objects of the same type (e.g. relationships between people objects, such as between family members, co-workers, persons who have interacted with each other) and/or between objects of different types (e.g. relationships between a person object and a non-person object, such as between a person and a schedule, a person and an investigation). For example, objects representing individual investigations (e.g. of accidents, of claims, of demand for rights) may be related to an object representing a group of investigations (e.g. based on commonalities, or based on a user input). Such relationships may effectuate grouping individual investigations into groups of investigations. As another example, objects representing individual investigations may be related to an object representing persons (e.g. persons associated with investigations). Relationships between objects may include one-to-one relationships, one-to-many relationships, many-to-one relationships, many-to-many relationships, and/or other relationships.

The system 100 further comprises an ontology layer 106. The ontology layer 106 provides metadata (herein also referred to as an ontology) for interpreting objects in the data repository. Data defined in the ontology is herein described as "ontological data".

An ontology may define aspects of objects, such as how properties of an object may be presented and/or modified. For example, an ontology may include a person object type including a name property, and the ontology may define how the name may be presented (e.g. first name followed by last name; last name followed by first name; first name followed by initial). The ontology may define a display prominence of an object. For example, the object may be assigned a "Prominent", "Normal" or "Hidden" display prominence. Prominent objects can be rendered before normal properties when displaying a portion of the properties. Normal objects may be assigned no special prominence in the display order. Hidden objects may not be displayed.

The ontology may define how/whether the name may be modified (e.g. based on user input, based on user account privileges). As another example, a definition of a person may include one or more relationship properties and the ontology may define how/whether the relationships may be presented and/or modified. In some embodiments, an ontology may define whether/how properties of an object may be created and/or removed. For example, an ontology may define whether a user may add or remove one or more properties of the person object type. The definitions/ontologies may be created based on user input. The definitions/ontologies may be modified (e.g. based on user input, based on system changes).

The ontology may define how one or more of the datasets 104 in the data repository 102 are related. For example, the ontology may define joins between datasets 104 in the data repository 102. Joins may comprise links between the data to allow for multiple datasets to be navigated and/or searched as if they were a single dataset.

Ontologies may be defined via a user interface 110 and stored in the ontology layer 106.

Ontologies may be defined automatically by the ontology layer 106. Ontological data may be prepopulated based on properties of the one or more datasets 104 in the data repository 102. For example, the ontology layer 106 may scan across one or more of the datasets 104 to determine/predict any relationships between objects in the dataset and/or a display prominence for one or more objects in the datasets 104. For example, the fraction of column/row values in a column/row that contain a unique value can be used as an indication of the importance of that column/row. The importance of the column/row can be used to determine a display prominence for objects in that column/row. In a further example, the cardinalities of a column/row can be used to determine the possible display mode for displaying data in that column/row (e.g. which graph types the data can be displayed as).

The ontology layer is stored on one or more servers in the system. It stores key values of object types, for example the definitions of object types. The ontology layer can be stored in the JavaScript Object Notation (JSON) format, or in any other suitable format. Object types and/or object have an identifier, properties and metadata associated with them. Data in datasets in the data repository are tied to their respective object types. The ontological data is tied to its backing dataset by primary dataset identifiers.

The system 100 further comprises a data aggregation module 108. The data aggregation module 108 generates searchable databases from the plurality of datasets 104 in response to a user search request using the ontology in the ontology layer 106.

The data aggregation module 108 may take a dataset mentioned in ontology, synchronize the dataset into a searchable database and automatically resynchronize the database with the underlying dataset and ontology while remaining available to be queried.

The system additionally comprises a user interface 110, for example in the form of a graphical user interface. The user interface allows a user to interact with the system, for example to interact with objects stored in the datasets stored in the data repository or to edit the ontology. As an example of a user interaction, the user may input a search request into the system via the user interface. The search request may be input in a functional language, which may be converted to a database query for querying the one or more datasets 104 in the data repository 102. For example, a high-level functional search request may be converted into a Query Domain Specific Language (DSL) based on JavaScript Object Notation (JSON). This can reduce the effort needed for an analyst or a developer to interact with the datasets 104.

A search request may return one or more objects that match one or more searching criteria. Criteria for a search request may include one or more parameters relating to properties of objects, reference identifiers of objects, and/or other criteria. In some embodiments, a reference identifier for an object may include one or more of a service, instance, type and/or locator. One or more filters may be supplied with the search request. In some embodiments, a search request may support a keyword filter (e.g., searching one or more fields of objects for a specified query string/value), an object type filter (e.g. limiting the search results to a specific set of object types), a property filter (e.g. specifying a query string/value to match on to one or more specific properties for a specific object/object type and/or one or more global properties that multiple objects/object types may share). A search result may require matching on some or all of the specified criteria.

Objects returned by the search request may be viewed through the user interface. A list of objects meeting the search criteria can be displayed on the user interface. The user may select one or more the objects to view and/or interact with.

When an object is selected to be viewed, a dashboard is auto-generated using the ontology. The dashboard allows the user to interact with the object view in the ways defined in the ontology. The object view may comprise links to other objects, as defined in the ontology. The links may be one-to-one, one-to-many or many-to-one. Where one-to-many links are indicated by the ontology, the object view may include one or more tabs allowing the user to select which of the links to navigate to view a linked object.

Furthermore, in some examples, the ontology may define a plurality of object views for an object and/or link. The object view may then comprise a view tab through which the user can select which of the views of the object to display. The initial/default view of the object displayed to the user may be defined in the ontology.

Figure 2:
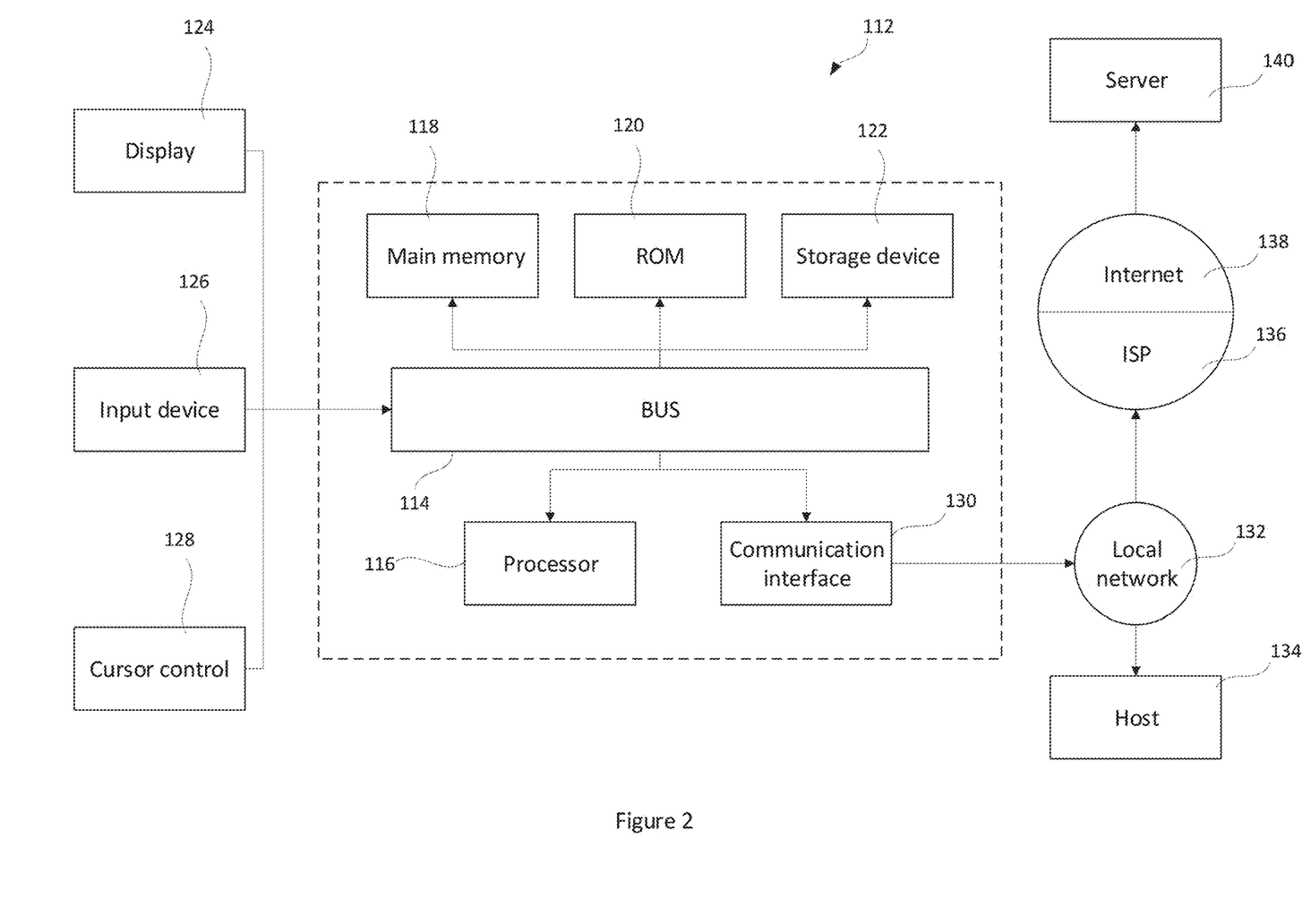
FIG. 2 shows a block diagram of an exemplary computer system.

Referring to FIG. 2, a block diagram of an exemplary computer system, which may comprise the data repository, the client device, the data aggregation module and/or the ontology layer, consistent with examples of the present specification is shown.

Computer system 112 includes a bus 114 or other communication mechanism for communicating information, and a hardware processor 116 coupled with bus for processing information. Hardware processor 116 can be, for example, a general purpose microprocessor. Hardware processor 116 comprises electrical circuitry.

Computer system 112 includes a main memory 118, such as a random access memory (RAM) or other dynamic storage device, which is coupled to the bus for storing information and instructions to be executed by processor. The main memory 118 can also be used for storing temporary variables or other intermediate information during execution of instructions by the processor 116. Such instructions, when stored in non-transitory storage media accessible to the processor, render the computer system 112 into a special-purpose machine that is customized to perform the operations specified in the instructions. The main memory 118 may be referred to as volatile memory.

Computer system 112 further includes a read only memory (ROM) 120 or other static storage device 122 coupled to the bus for storing static information and instructions for the processor 1. A storage device 122, such as a magnetic disk or optical disk, is provided and coupled to the bus for storing information and instructions.

Computer system 112 can be coupled via the bus to a display 124, such as a cathode ray tube (CRT), liquid crystal display, or touch screen, for displaying information to a user. An input device 126, including alphanumeric and other keys, is coupled to the bus 114 for communicating information and command selections to the processor 116. Another type of user input device 126 is cursor control 128, for example using a mouse, a trackball, or cursor direction keys for communicating direction information and command selections to the processor and for controlling cursor movement on the display. The input device 126 typically has two degrees of freedom in two axes, a first axis (for example, x) and a second axis (for example, y), that allows the device to specify positions in a plane.

Computer system 112 can implement the techniques described herein using customized hard-wired logic, one or more ASICs or FPGAs, firmware and/or program logic which in combination with the computer system causes or programs computer system to be a special-purpose machine. According to some embodiments, the operations, functionalities, and techniques disclosed herein are performed by computer system in response to the processor executing one or more sequences of one or more instructions contained in the main memory. Such instructions can be read into the main memory from another storage medium, such as storage device. Execution of the sequences of instructions contained in main memory causes the processor to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device. Volatile media includes dynamic memory, such as main memory 118. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus. Transmission media can also take the form of acoustic or light waves, such as those generated during radio-wave and infra-red data communications.

Various forms of media can be involved in carrying one or more sequences of one or more instructions to processor for execution. For example, the instructions can initially be carried on a magnetic disk or solid state drive of a remote computer. The remote computer can load the instructions into its dynamic memory and send the instructions over a telephone line or other transmission medium using a modem. A modem local to computer system can receive the data on the telephone line or other transmission medium and use an infra-red transmitter to convert the data to an infra-red signal. An infra-red detector can receive the data carried in the infra-red signal and appropriate circuitry can place the data on bus. Bus carries the data to the main memory, from which the processor retrieves and executes the instructions. The instructions received by the main memory can optionally be stored on the storage device either before or after execution by the processor.

Computer system also includes a communication interface 130 coupled to the bus 114. The communication interface provides a two-way data communication coupling to a network link that is connected to a local network 132. For example, the communication interface can be an integrated services digital network (ISDN) card, cable modem, satellite modem, or a modem to provide a data communication connection to a corresponding type of telephone line. As another example, the communication interface 1330 can be a local area network (LAN) card to provide a data communication connection to a compatible LAN. Wireless links can also be implemented. In any such implementation, the communication interface 130 sends and receives electrical, electromagnetic or optical signals that carry digital data streams representing various types of information.

The network link typically provides data communication through one or more networks to other data devices. For example, the network link can provide a connection through the local network 132 to a host computer 134 or to data equipment operated by an Internet Service Provider (ISP) 136. The ISP 136 in turn provides data communication services through the world wide packet data communication network now commonly referred to as the "Internet" 8. The local network 132 and internet 138 both use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), network link and communication interface. For example, a first application server may transmit data through the local network to a different application server 140.

Figure 3:
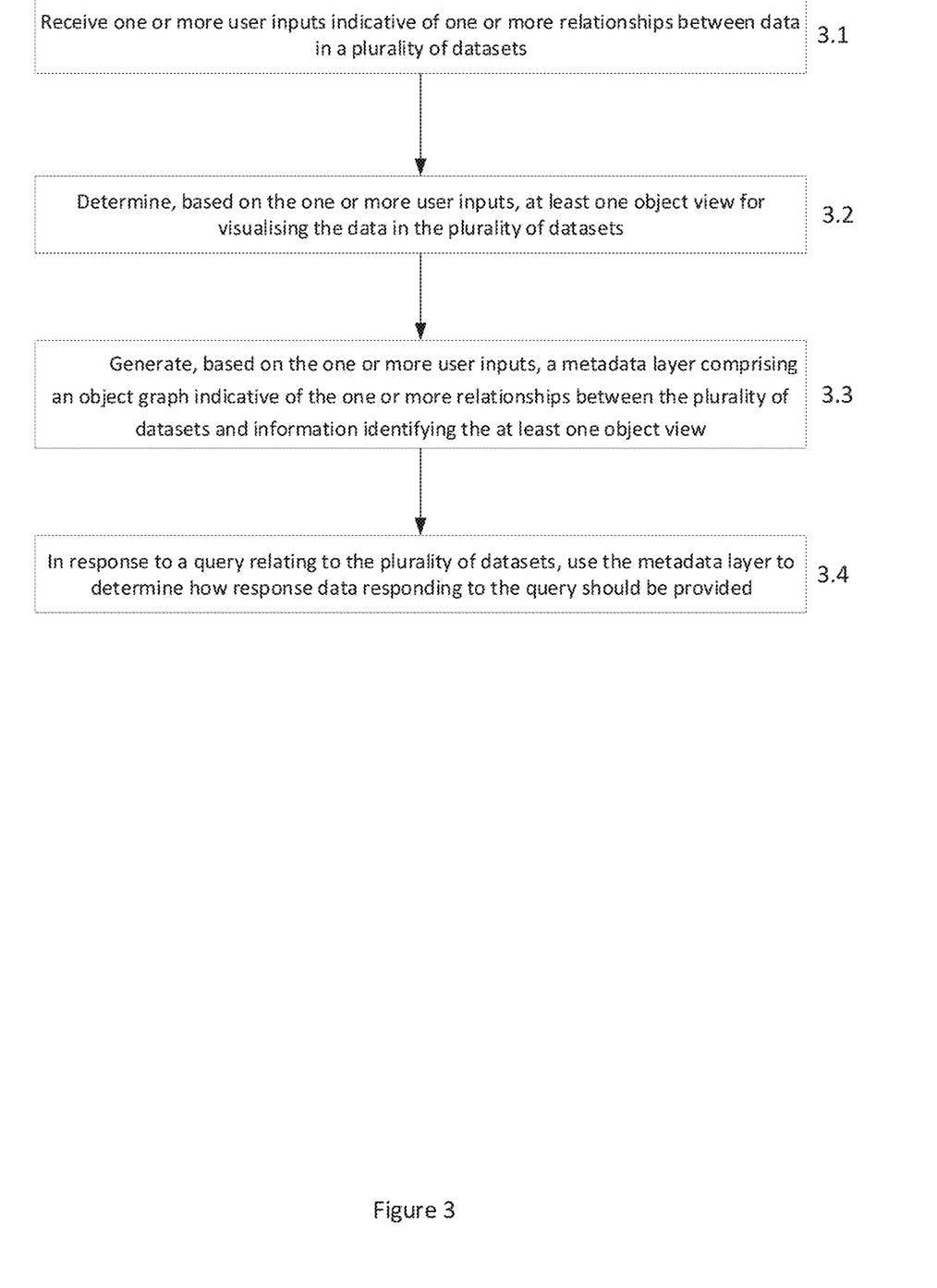
FIG. 3 shows a flowchart of an example of a method of using a data aggregation and processing system.

FIG. 3 shows a flowchart of an example of a method of using a data aggregation and processing system.

At operation 3.1 the system receives one or more inputs from a user indicative of one or more relationships between data in the plurality of datasets. The relationships may comprise definitions of global properties and/or links between datasets, as described below.

At operation 3.2 the one or more user inputs are used to determine at least one object view for visualizing the data in the plurality of datasets. For example, a display prominence of the object can be determined. In some embodiments, the format of the object display can be determined based on the user inputs. For example, based on the relationship identified, the data could be presented as: a histogram; a bar chart; a pie chart; a list; a dashboard view; and/or a line graph.

At operation 3.3 the one or more user inputs are used to generate metadata for a metadata layer (also referred to as an ontology layer 106 or ontological layer) that comprises an object graph indicative of the one or more relationships between two or more of the plurality of datasets. The metadata layer further comprises information identifying the at least one object view determined at operation 3.2. The metadata layer may comprise one or more YML and/or JSON format files. Relationships not defined on datasets/object types directly, by constructed/put together when search requests are input. The metadata can be stored in a metadata layer one or more servers.

At operation 3.4 a query relating to the plurality of datasets is received by the system. In response to the query, the metadata layer is used to determine how response data should be provided. The data-aggregation layer 108 in the system interprets the metadata in the ontology layer 106, and uses it to search the underlying datasets. Display of the results of the query can be determined based on the metadata. For example, low cardinality objects can be provided with a histogram of options.

As an example of how the ontology/metadata can be used to respond to the query, the data aggregation module 108 can access the data repository 102 to retrieve the objects related to the search request. The data aggregation module 108 can generate a searchable database from the retrieved objects using the ontology in the ontology layer 106. For example, joins between datasets and/or common global properties between datasets can be used to combine multiple datasets in to the searchable database. From the searchable database, a view of one or more of the objects can be generated. The object view is generated based on the ontology in the ontology layer 106. For example, the ontology layer can define that an object should be presented as a bar chart, a line graph, a histogram, a table, a list or any other type of view. The ontology can also define the prominence of the objects, which can determine the order in which a plurality of objects will be displayed and/or if the object can be displayed at all to a user. The generated object view may be in the form of a dashboard.

In some embodiments, the metadata layer comprises one or more global properties. Global properties indicate objects/object types/object properties that are common throughout the ecosystem of datasets. The global properties allow for metadata in the metadata layer to be associated with a plurality of objects/object types/object properties in the datasets without the need to explicitly associate the objects/object types/object properties with that metadata. This can reduce the amount of memory required to store the datasets and the associated metadata. It can further allow for aggregation across datasets/tables with the same global property.

The global property may define a particular format or particular formats of data that will be associated with a set of metadata. For example, a global property "telephone number" can be set up that defines one or more data formats that telephone numbers can be provided in (for example, as a continuous sequence of numbers, a sequence of numbers with spaces at particular points, and/or a sequence of numbers with a subset of the numbers enclosed in brackets). Data falling within the definition will then be associated with the global property "telephone number", as well as the metadata associated with global property "telephone number".

Figure 4:
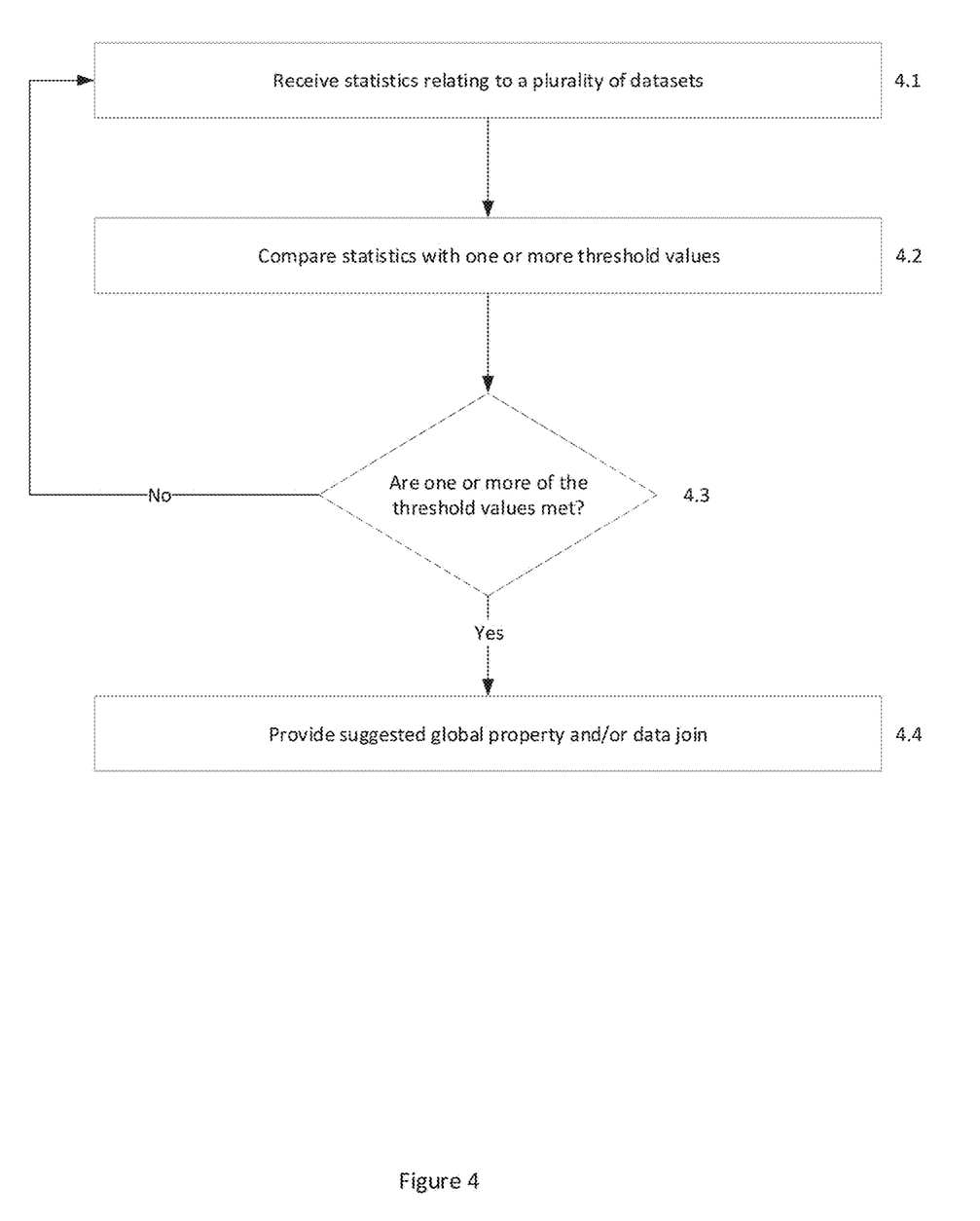
FIG. 4 shows a flow chart of a method of inferring potential global properties and/or dataset joins.

FIG. 4 shows a flow chart of a method of inferring potential global properties and/or dataset joins. The method can be carried out by the system described in relation to FIG. 1. The system may comprise a dedicated suggestion engine for performing the method.

At operation 4.1 the system receives statistics relating to the plurality of datasets. A statistics server may serve the statistics to the system. Alternatively, the system may determine the statistics itself.

The statistics relating to the dataset may comprise one or more of: a proportion of datasets comprising an object type and/or property; a uniqueness score; cardinalities of object types and/or properties; and/or a title key. For example, the number of times a data column with a particular title appears across the datasets may be counted.

At operation 4.2 the system compares the statistics with one or more thresholds. The one or more thresholds may comprise, for example: a minimum proportion of datasets containing an object type and/or property; a minimum uniqueness score; and a maximum and/or minimum cardinality of object types and/or properties.

The thresholds correspond to types global properties that may be present in the datasets. As an example, a uniqueness threshold of 100% may be required to identify a property type as a primary key for a plurality of datasets.

At operation 4.3 the system determines if any of the one or more thresholds have been met, in the sense of the threshold having been reached or exceeded.

If one or more of the thresholds have been met, the system infers that a global property may be present. At operation 4.4, the inferred global property is provided as a suggestion to the user through the user interface of the system. The user can accept the suggestion or dismiss it, for example by clicking an option in a GUI.

The system can, in some embodiments, also provide suggestions for joins between different datasets in the data repository. In some embodiments, these suggestions are provided by the suggestion engine. The global properties can be used to infer the joins between datasets. For example, a global property may correspond to a property name in objects of a particular type. Datasets relating to that object type and containing that property name can be inferred by the system to be linked. Based on the inference, a join between those datasets can be suggested to the user through the user interface.

In a further example, links between datasets containing objects matching a global property definition can be suggested. For example, the global property may be defined by data in a particular format or formats. Links between datasets can be inferred based on the datasets having rows and/or columns of data where the data meets a threshold related to the global property definition. For example, if a row/column of the dataset comprises more than a threshold proportion of its data meeting the definition of the global property.

The same method described in relation to FIG. 4 can be used for inferring and suggesting the join.

In some embodiments, the suggested joins and global properties can be used to auto-populate the ontology without user input.

Figure 5:
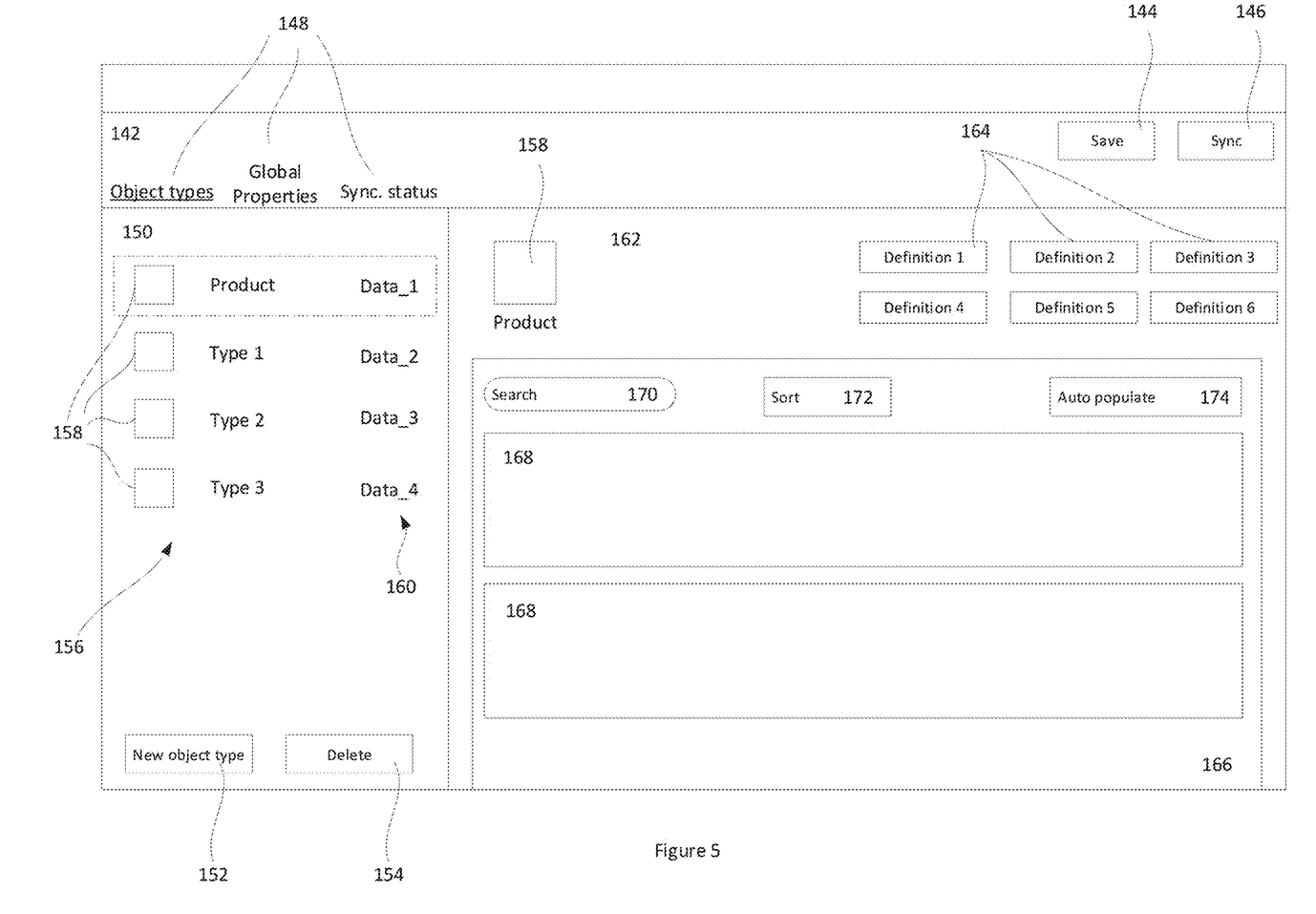
FIG. 5 shows an example graphical user interface through which a user can define object types.
Figure 6:
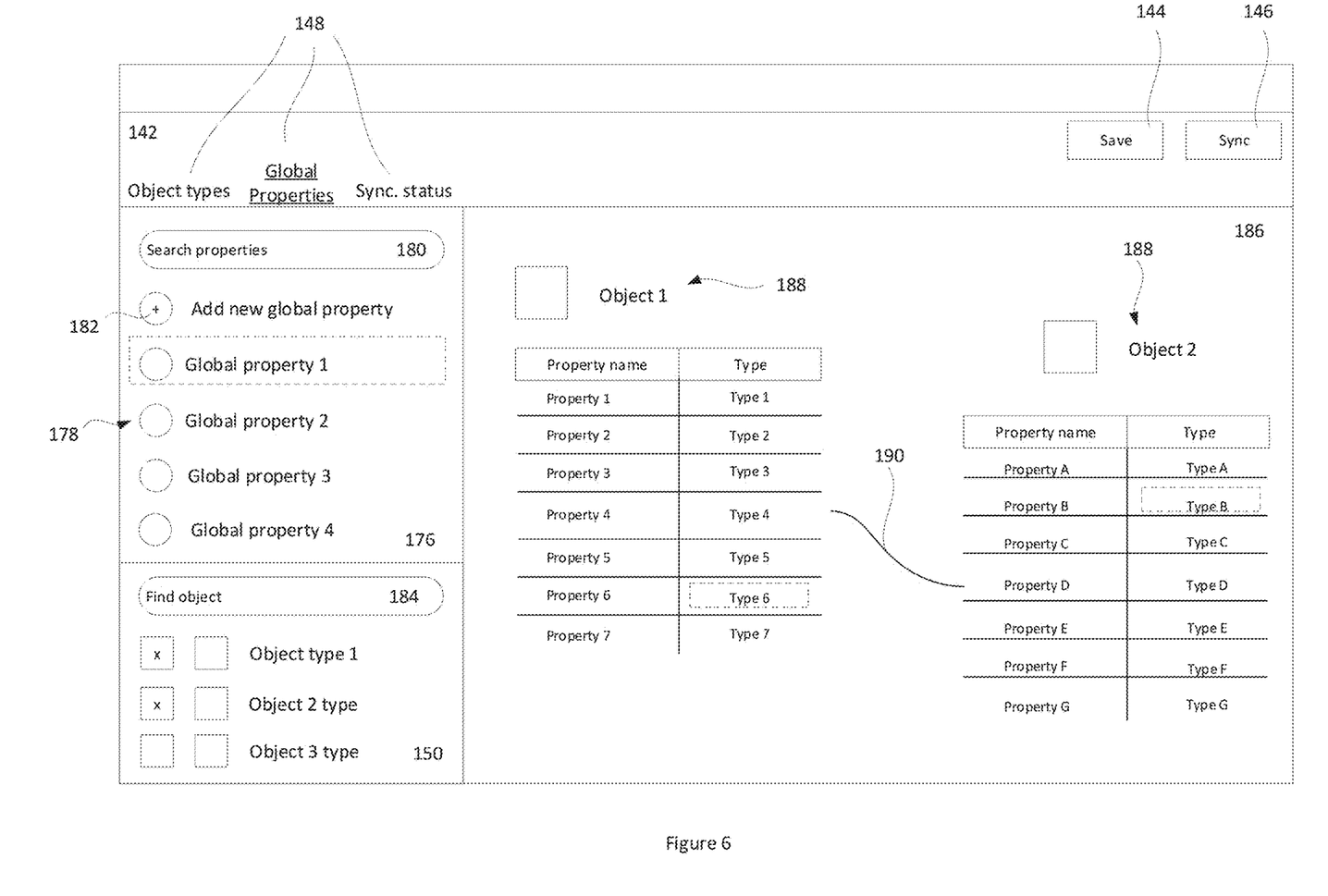
FIG. 6 shows an example graphical user interface through which a user can view and edit global property links between datasets.
Figure 7:
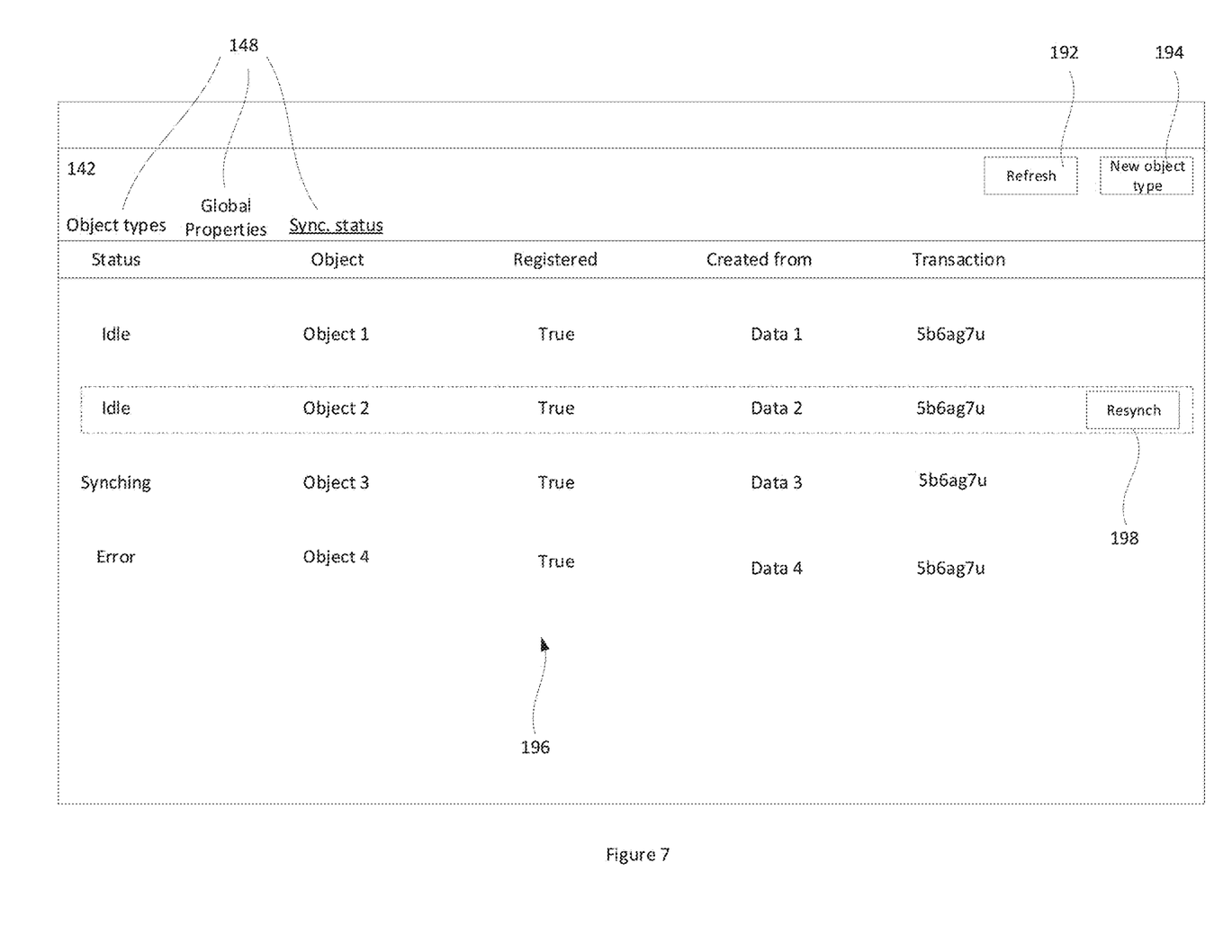
FIG. 7 shows an example graphical user interface through which a user can view synchronization data and synchronize object definitions with the system.

FIGS. 5-7 show examples of a user interface through which a user can define, view and edit an ontology. The graphical user interface (GUI) comprises a main toolbar 142. The main toolbar 142 comprises a save icon 144 for saving the ontology data created by the user using the interface, and a sync icon 146 for synchronizing the ontology data created by the user with the ontology layer 106 and/or the data aggregation layer 108. The sync icon and/or save icon may, in some embodiments, initiate conversion of the settings input through the user interface into ontology metadata, for example a file in a YML or JSON format. The main toolbar further comprises one or more navigation tabs 148 through which the user can navigate the GUI. In the example shown, the navigation tabs comprise "Object types", which displays the user interface shown in FIG. 5, "Global properties", which displays the user interface shown in FIG. 6, and "Sync. status", which displays the user interface shown in FIG. 7.

FIG. 5 shows an example graphical user interface through which a user can define object types. This "object types" view comprises an object panel 150. Through the object panel 150 a user can create a new object type using a "New object type" icon 152, or delete an object type using a "Delete" icon 154. A list of previously defined object types 156 is displayed in the panel. Each of the object types in the list is displayed with its associated icon 158 and the identity of the dataset 160 or sets from which it is taken.

The object type view further comprises an object window 162. The object window 162 displays properties of the object type selected by the user in the object panel 150. In this example, the selected object type is "Product", which is highlighted in the object panel 150. The object window 162 comprises the object icon 158 associated with the selected object type and one or more object type definitions 164. The object type definitions 164 may comprise one or more of: a pointer to one or more datasets that define the object type; one or more dataset paths for data to populate the object type; an icon 158 representing the object; an object type name; a primary key for the object type; and/or the title column of the object type. The object type definitions 164 are editable by the user.

The object window 162 further comprises a dataset mapping window 166. The dataset mapping window 166 allows dataset columns and/or rows in the datasets defining the object type to be mapped to object properties 168. It can also allow the display settings of object properties to be set. The dataset mapping window 166 comprises a search bar 170 for searching for columns and/or rows of datasets. It further comprises a sort tab 172 for sorting the columns and/or rows of the datasets defining the object type. For example, the columns and/or rows could be sorted by name or cardinality. The dataset mapping window 166 can further comprise an auto-populate icon 174 can allow the user to attempt to auto-generate a mapping between object properties and the dataset columns/rows based on, for example, column/row titles, data types, and/or cardinalities.

FIG. 6 shows an example graphical user interface through which a user can view and edit global property links between datasets. The GUI allows links between object types and how they are being joined to be viewed. It is useful during set up and analysis of ontology. This "global properties" view comprises a global properties panel 176. The global properties panel 176 comprises a list of global properties 178. It further comprises a global properties search tab 180 and an icon for adding new global properties 182 to the list 178. One or more global properties can be selected, and will be highlighted in the global properties panel 176, as indicated by the dashed box.

The global properties view further comprises an object panel 150, allowing the user to select one or more object types to view. The object panel 150 comprises a list of one or more object types, along with an object search bar 184 for searching for object types in the list.

The global properties view further comprises a global properties window 186. The global properties window 186 displays the object types 188 selected by the user in the object panel 150. Each object type 188 is displayed with a list comprising the property names of the object and the corresponding property types. Links and/or joins 190 between the displayed object properties are indicated. Property types corresponding to the selected global property in the global properties panel 176 are highlighted.

FIG. 7 shows an example graphical user interface through which a user can view synchronization data and synchronize object definitions with the system. This "object synchronization" view comprises a toolbar 142 comprising a refresh icon 192 for refreshing the view. In some embodiments, the refresh icon 192 synchronizes all object types in the view. The toolbar 142 further comprises a new object icon 194 for creating new object types. In some embodiments, the new object icon 194 returns the user to the "object types" view.

Object types and properties defined by a user are saved to a local cache associated with the user until the user synchronizes the object types and properties with the ontology layer. The object synchronization view allows for management of this process.

The object synchronization view comprises a list of object types 196, the list comprising their synchronization statuses. The statuses may comprise, for example, "Idle", indicating that the object type has been synchronized successfully at its last synchronization event, "Synching", indicating that the object type is in the process of being synchronized with the system, and "Error", indicating that the object type was not successfully synchronized at the last synchronization event.

The list may also comprise a registration status, indicating whether the object type has been registered with the system. It may further comprise the identity of the dataset from which the object type was created. A transaction ID may also be provided.

The user can select an object type in the list 196. A selected object type will be highlighted (as shown by the dashed lines here). The user can be provided with a "Resynch" icon 198 for the highlighted object type, allowing that object type to be individually synchronized with the system.

In some embodiments, functions can be defined on the ontology and stored by the system. Expressions can be built up from these functions to perform complex queries using the ontology. The ontology contains object definitions and relations between objects, and these can be used to construct the expressions. For example, a "cars.parts" expression can be defined that provides a list of car parts (i.e. a list of objects having the global property "Car" and the property "part"). The ontology specifies that the object type "Car" is associated with an object type "Parts", which can be used to generate the list. The provided list can be sorted using, for example, a "parts.location" expression that gives lists of car parts for a particular location on a car, for example "parts.chassis" provides a list of car parts for the chassis location. The options for filtering and sorting the list are defined by the ontology. The expressions may comprise functions over datasets or object types. For example, a function can be defined to calculate a set of key values from data. The function can then display the calculated values to a user, such a scientist. Expressions defined in this way can be saved to an expression library in the system.

In general, a user can interact with the ontology to retrieve stored expressions. The ontology provides metadata comprising relationships, type definitions and definitions of what properties of datasets can be filtered over. For example, a "date" type can be filtered over a range of values as defined in the ontology.

The ontology allows expressions to be chained together to create longer and/or more complex expressions. This simplifies the user interaction with the underlying datasets, as the user can perform functions on the data in a single step. Expressions built up by a user in this way can be translated into a database query in one or more of the languages of the datasets, for example an SQL query/elastic search. This translation of the query can be performed on the fly. The ontology thereby effectively provides a translation layer for expressions, avoiding the user having to have knowledge of the languages used to query the underlying datasets.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

It will be appreciated that many modifications may be made to the embodiments hereinbefore described. Such modifications may involve equivalent and other features which are already known in automated monitoring and control of machinery, and which may be used instead of or in addition to features already described herein. Features of one embodiment may be replaced or supplemented by features of another embodiment.

In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although claims have been formulated in this application to particular combinations of features, it should be understood that the scope of the disclosure of the present disclosure also includes any novel features or any novel combination of features disclosed herein either explicitly or implicitly or any generalization thereof, whether or not it relates to the same disclosure as presently claimed in any claim and whether or not it mitigates any or all of the same technical problems as does the present disclosure.

What is claimed is:

1. A method, the method being performed using one or more processors, comprising:
   accessing a plurality of datasets, wherein the plurality of datasets includes tables such that each table comprises rows representing objects and columns representing object properties;
   receiving one or more user inputs indicative of one or more relationships between data in the plurality of datasets;
   determining, based at least in part on the one or more user inputs, at least one object view for visualizing the data in the plurality of datasets;
   determining a global property associated with a portion of data in at least two of the plurality of datasets, wherein the global property indicates one or more columns representing object properties that are associated with the portion of data;
   generating, based at least in part on the one or more user inputs, metadata comprising:
      an object graph indicative of the one or more relationships between two or more of the plurality of datasets;
      the global property; and
      information identifying the at least one object view; and
   in response to a query relating to the plurality of datasets, using the metadata to determine how response data responding to the query should be provided, wherein the query is guided by the global property such that the query is applied to the portion of data associated with the global property.

2. The method of claim 1, wherein the metadata further comprises a join between at least two datasets.

3. The method of claim 2, wherein the global property is assigned to a portion of the data in at least two of the plurality of datasets.

4. The method of claim 3, wherein determining how the response data should be provided comprises searching the plurality of datasets, wherein the search is guided by the global property.

5. The method of claim 4, wherein the user input defines a global property that applies to the plurality of datasets.

6. The method of claim 5, wherein the global property is determined using a method comprising:
  receiving one or more statistics relating to the dataset;
  comparing the one or more statistics to one or more threshold criteria; and
  in response to one or more of the threshold criteria being met, providing a suggested global property to a user associated with the user input.

7. The method of claim 6, wherein the user input comprises confirming the suggested global property provided to the user.

8. The method of claim 7, wherein the one or more thresholds comprises at least one of: a proportion of datasets comprising an object type or property; a uniqueness score; cardinalities of object types or properties; or a title key.

9. The method of claim 8, wherein the method further comprises inferring one or more joins between datasets based on the global property.

10. The method of claim 9, wherein the global property is defined by one or more data formats or one or more data types.

11. The method of claim 10, further comprising synchronizing the metadata with a metadata layer stored on a server.

12. The method of claim 11, wherein the at least one object view comprises an object prominence.

13. A system comprising:
  memory configured to store instructions; and
  one or more processors in communication with the memory, the one or more processors configured to execute the instructions to cause the system to:
    access a plurality of datasets, wherein the plurality of datasets includes tables such that each table comprises rows representing objects and columns representing object properties;
    receive, via a user interface, one or more user inputs indicative of one or more relationships between data in the plurality of datasets;
    determine, based at least in part on the one or more user inputs, at least one object view for visualizing the data in the plurality of datasets;
    determining a global property associated with a portion of data in at least two of the plurality of datasets, wherein the global property indicates one or more columns representing object properties that are associated with the portion of data;
    generate, based at least in part on the one or more user inputs, metadata comprising:
      an object graph indicative of the one or more relationships between two or more of the plurality of datasets;
      the global property; and
      information identifying the at least one object view; and
    in response to a query relating to the plurality of datasets, use the metadata to determine how response data responding to the query should be provided wherein the query is guided by the global property such that the query is applied to the portion of data associated with the global property.

14. The system of claim 13, wherein the metadata further comprises a join between at least two datasets.

15. The system of claim 14, wherein the global property is assigned to a portion of the data in at least two of the plurality of datasets.

16. The system of claim 15, wherein determining how the response data should be provided comprises searching the plurality of datasets, wherein the search is guided by the global property.

17. The system of claim 16, wherein the user input defines a global property that applies to the plurality of datasets.

18. The system of claim 17, wherein the one or more processors are configured to execute the instructions to further cause the system to determine the global property by at least:
  receiving one or more statistics relating to the dataset;
  comparing the one or more statistics to one or more threshold criteria; and
  in response to one or more of the threshold criteria being met, providing a suggested global property to a user associated with the user input.

19. The system of claim 18, wherein the user input comprises confirming the suggested global property provided to the user.

20. A non-transitory computer readable medium having computer readable code stored thereon, the computer readable code, when executed by at least one processor, causing performance of the steps of:
  accessing a plurality of datasets, wherein the plurality of datasets includes tables such that each table comprises rows representing objects and columns representing object properties;
  receiving, via a user interface, one or more user inputs indicative of one or more relationships between data in the plurality of datasets;
  determining, based at least in part on the one or more user inputs, at least one object view for visualizing the data in the plurality of datasets;
  determining a global property associated with a portion of data in at least two of the plurality of datasets, wherein the global property indicates one or more columns representing object properties that are associated with the portion of data;
  generating, based at least in part on the one or more user inputs, metadata comprising:
    an object graph indicative of the one or more relationships between two or more of the plurality of datasets;
    the global property; and
    information identifying the at least one object view; and
  in response to a query relating to the plurality of datasets, using the metadata to determine how response data responding to the query should be provided, wherein the query is guided by the global property such that the query is applied to the portion of data associated with the global property.

* * * * *

UNITED STATES PATENT AND TRADEMARK OFFICE
CERTIFICATE OF CORRECTION

PATENT NO.       : 10,838,970 B2
APPLICATION NO.  : 16/028886
DATED            : November 17, 2020
INVENTOR(S)      : Myles Scolnick Page 1 of 1

It is certified that error appears in the above-identified patent and that said Letters Patent is hereby corrected as shown below:

On the Title Page

On Page 2, Column 1, Item (56), Line 3, under Other Publications, delete "al.." and insert --al.,--.

In the Specification

In Column 6, Line 67, delete "processor 1." and insert --processor 116--.

In the Claims

In Column 15, Line 56, Claim 13, delete "provided" and insert --provided,--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*